United States Patent
Ascanio et al.

(10) Patent No.: US 7,088,887 B2
(45) Date of Patent: Aug. 8, 2006

(54) ISOTHERMAL THIN FILM HEATER

(75) Inventors: Peter D. Ascanio, Fremont, CA (US); Thomas S. Tarter, San Jose, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 85 days.

(21) Appl. No.: 10/744,790

(22) Filed: Dec. 23, 2003
(Under 37 CFR 1.47)

(65) Prior Publication Data

US 2005/0135743 A1    Jun. 23, 2005

(51) Int. Cl.
*G02B 6/34* (2006.01)
*G02B 6/12* (2006.01)
*H05B 1/00* (2006.01)
*H05B 3/20* (2006.01)

(52) U.S. Cl. .......................... 385/37; 385/14; 385/134; 219/209; 219/443.1

(58) Field of Classification Search ................ 219/209, 219/441.1, 466.1, 468.1; 385/37, 134
See application file for complete search history.

(56) References Cited

U.S. PATENT DOCUMENTS

| | | | |
|---|---|---|---|
| 5,919,383 A * | 7/1999 | Beguin et al. | 219/209 |
| 6,583,388 B1 * | 6/2003 | Crafts et al. | 219/209 |
| 6,752,531 B1 * | 6/2004 | McWilliams | 374/149 |
| 6,757,452 B1 * | 6/2004 | Shin et al. | 385/14 |
| 6,788,870 B1 * | 9/2004 | Maxham et al. | 385/135 |
| 2004/0149718 A1 * | 8/2004 | Ito et al. | 219/444.1 |

OTHER PUBLICATIONS

International Search Report for PCT/US04/43334 dated Nov. 28, 2005.

* cited by examiner

*Primary Examiner*—Sung Pak
*Assistant Examiner*—Omar Rojas
(74) *Attorney, Agent, or Firm*—Amin & Turocy, LLP

(57) ABSTRACT

Systems and methods for an isothermal thin film heater are provided. The isothermal thin film heater mitigates temperature variations in an optical circuit, such as an arrayed-waveguide grating. The thin film heater comprises a conductive plate and at least one heating element trace coupled to the conductive plate for heating the optical circuit. The heating element trace(s) is arranged around a periphery portion of the conductive plate such that concentric arcs are formed by the heating element trace(s). A sensor for sensing the temperature of the thin film heater and/or the optical circuit can also be provided.

21 Claims, 12 Drawing Sheets

ISOTHERMAL THIN FILM HEATER

FIELD OF THE INVENTION

The present invention generally relates to an isothermal thin film heater, an optical integrated circuit containing the isothermal thin film heater, and methods of making and using the isothermal thin film heater and the optical integrated circuit.

BACKGROUND OF THE INVENTION

As optical networks increasingly carry burgeoning Internet traffic, the need for advanced and efficient optical components rises. Optical communication systems permit the transmission of large quantities of information. Improved optical integrated circuits (OICs) are particularly needed. OICs come in many forms such as 1×N optical splitters, optical switches, wavelength division multiplexers (WDMs), demultiplexers, optical add/drop multiplexers (OADMs), and the like. Optical circuits allow branching, coupling, switching, separating, multiplexing and demultiplexing of optical signals without intermediate transformation between optical and electrical media.

Such optical circuits include planar lightwave circuits (PLCs) having optical waveguides on flat substrates, which can be used for routing optical signals from one of a number of input optical fibers to any one of a number of output optical fibers or optical circuitry. PLCs make it possible to achieve higher densities, greater production volume and more diverse functions than are available with fiber components through employment of manufacturing techniques typically associated with the semiconductor industry. For instance, PLCs contain optical paths known as waveguides formed on a silicon wafer substrate, wherein the waveguides are made from transmissive media which have a higher refractive index than the chip substrate or the outlying cladding layers in order to guide light along the optical path. PLCs are fashioned to integrate multiple components and functionalities into a single optical chip.

One important application of PLCs specifically and OICs generally involves wavelength-division multiplexing (WDM) including dense wavelength-division multiplexing (DWDM). DWDM allows optical signals of different wavelengths, each carrying separate information, to be transmitted via a single optical channel or fiber in an optical network. In order to provide advanced multiplexing and demultiplexing (e.g., DWDM) and other functions in such networks, arrayed-waveguide gratings (AWGs) have been developed in the form of PLCs.

A problem with OICs/PLCs is polarization dependence of the waveguides, typically caused by thermal stress induced waveguide birefringence. Such birefringence is experienced in varying degrees with waveguide fabrication process. The difference in thermal expansion coefficient between the waveguide top cladding layer and the substrate causes thermal stress. That stress imposed on the waveguide core in a direction parallel to the surface usually is different from that in a perpendicular direction. When the stress is asymmetric to the waveguide core, birefringence is induced undesirably rotating the optical axes.

Stress induced waveguide birefringence results in a difference of refractive index of the waveguide in the direction between parallel and perpendicular to the waveguide. The birefringence, in turn, causes polarization dependence in the waveguides, where the propagation constant for TE (transverse electric) mode is different from TM (transverse magnetic) mode. Consequently, the device characteristics change in accordance with the polarized state of the light provided to the device. For AWG device, this difference in propagation constants results in a wavelength shift in the spectral response peak or the passband of each wavelength channel. A conventional AWG may exhibit a polarization dependent wavelength shift of 0.1 nm, which is sufficient to undesirably impact the performance of a PLC containing the AWG.

One method of reducing thermal stress induced birefringence and resultant polarization dependent wavelength shift involves matching the coefficient of thermal expansion of the top cladding with the coefficient of thermal expansion of the substrate. This can be accomplished by doping the top cladding with boron, if silicon wafer is used as substrate. However, high boron concentrations in the top cladding lead to corrosion problems.

This polarization sensitivity or dependence in AWGs and other dispersive components can be minimized by bisecting the waveguides with a half waveplate, in a slot between waveguide portions. The half waveplate causes polarization swapping partway along the optical paths of the bisected waveguides, such that any input polarization samples each propagation constant equally and provides essentially no shift in peak wavelength with changes in input polarization. Thus, the spectrum for the TE and TM modes coincide through the use of the half waveplate.

However, there are concerns with the use of half waveplates. For instance, although the conventional use of the half waveplate reduces the polarization sensitivity problems associated with waveguide birefringence, back reflection is increased and the mere presence of a half waveplate bisecting the waveguides generates insertion loss. Insertion loss is the total optical power loss caused by the insertion of an optical component, such as a half waveplate in this instance, into an optic system. A half waveplate bisecting the waveguides of an AWG can introduce an insertion loss of 0.5 dB.

Since most conventional AWG's are extremely sensitive to temperature variations, another method of reducing thermal stress induced birefringence and resultant polarization dependent wavelength shift involves using a heater in conjunction with a temperature sensor to control the temperature of the device, particularly in hot or cold ambient environments. The metric used to quantify the sensitivity of an optical circuit is referred to as the center wavelength shift over temperature. For example, a typical silica based AWG without temperature control has a center wavelength sensitivity of 11.0 picometer per degree C.

The current conventional thin film heaters are designed to provide constant flux heat input. However, a constant flux heater cannot heat the surface of the AWG as uniformly as desired. Referring to FIG. 1, a conventional constant flux heater 100 is shown. The heater 100 configuration contains two heating elements 110 and 120 centered on a metal plate 130. FIG. 2 shows a resulting temperature distribution 200 when the conventional constant flux heater 100 is attached to the metal plate 130 at 1.687 watts of heater power in an ambient temperature of −5° C. The temperature isotherms are circular and relatively tight. For example, as depicted in FIG. 2, different portions of the constant flux heater 100 have different temperature zones 1–17. Thus, the constant flux heater 100 does not contain a uniform temperature area of sufficient size for an AWG. Table 1 illustrates the different temperatures zones 1–17 for the constant flux heater at 1.687 watts and −5° C.

TABLE 1

| Zone | Temperature (° C.) |
|---|---|
| 1 | 83.922 |
| 2 | 83.864 |
| 3 | 83.807 |
| 4 | 83.750 |
| 5 | 83.692 |
| 6 | 83.635 |
| 7 | 83.577 |
| 8 | 83.520 |
| 9 | 83.463 |
| 10 | 83.405 |
| 11 | 83.348 |
| 12 | 83.290 |
| 13 | 83.233 |
| 14 | 83.175 |
| 15 | 83.118 |
| 16 | 83.061 |
| 17 | 83.003 |

Thus, an AWG coupled to the constant flux heater 100 can experience temperature variations ranging from about 0.570° C. to about 0.919° C.

Another method of reducing temperature variations across an AWG involves changing materials that constitute the AWG (cladding, substrate layer, waveguide material, and the like). One disadvantage to using different materials is that the problems associated with using a constant flux heater design are not addressed. Moreover, the materials often used to minimize the temperature variations can be expensive and difficult to obtain.

Yet another method of reducing temperature variations across an AWG involves using seperate, relatively small heaters, and separating the small heaters across the device. One disadvantage to using separate, small heaters is that the problems associated with using a constant flux heater design are not addressed. In addition, using separate, small heaters often involves differences in resistance from heater to heater that can change the local temperature profile.

Polarization dependence of optical network components, such as polarization dependent wavelength shift in AWGs affect a system's performance, especially when there are many components in the system. Consequently, there remains a need for better solutions to reduce temperature sensitivity in general and polarization dependence in particular in OICs/PLCs such as AWGs.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter. The present invention provides an isothermal heater that reduces temperature variations across an OIC/PLC, and an AWG in particular.

One aspect of the invention relates to an isothermal thin film heater for mitigating temperature variations in an optical circuit, such as an AWG. The thin film heater comprises a conductive plate and at least one heating element trace coupled to the conductive plate for heating the optical circuit. The heating element trace(s) is arranged around a periphery portion of the conductive plate such that concentric arcs are formed by the heating element trace(s).

Another aspect of the invention relates to a system for employing an isothermal thin film heater for heating an optical circuit. The system includes a thin film heater having a center portion for supporting the optical circuit. The thin film heater also includes at least one heating element trace configured around a periphery portion of the heater, such that the center portion has a substantially uniform temperature. The system can include a temperature monitoring system and/or a temperature regulating system.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The isothermal heater of the present invention mitigates/removes heating element traces from the center of the heater and pushes them out to the corners of the heater. The heating elements can be idealized as a line source. If the line heat source is configured as an arc of a circle with the center of the arc placed closer to the center of the heater, then temperature isotherms at the center of the heater become very uniform. As stated above, current conventional thin film heaters are designed to provide constant flux heat input. However, a constant flux heater cannot heat the surface of an OIC/PLC and/or an AWG as uniformly as an isothermal heater.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

Figure 3:
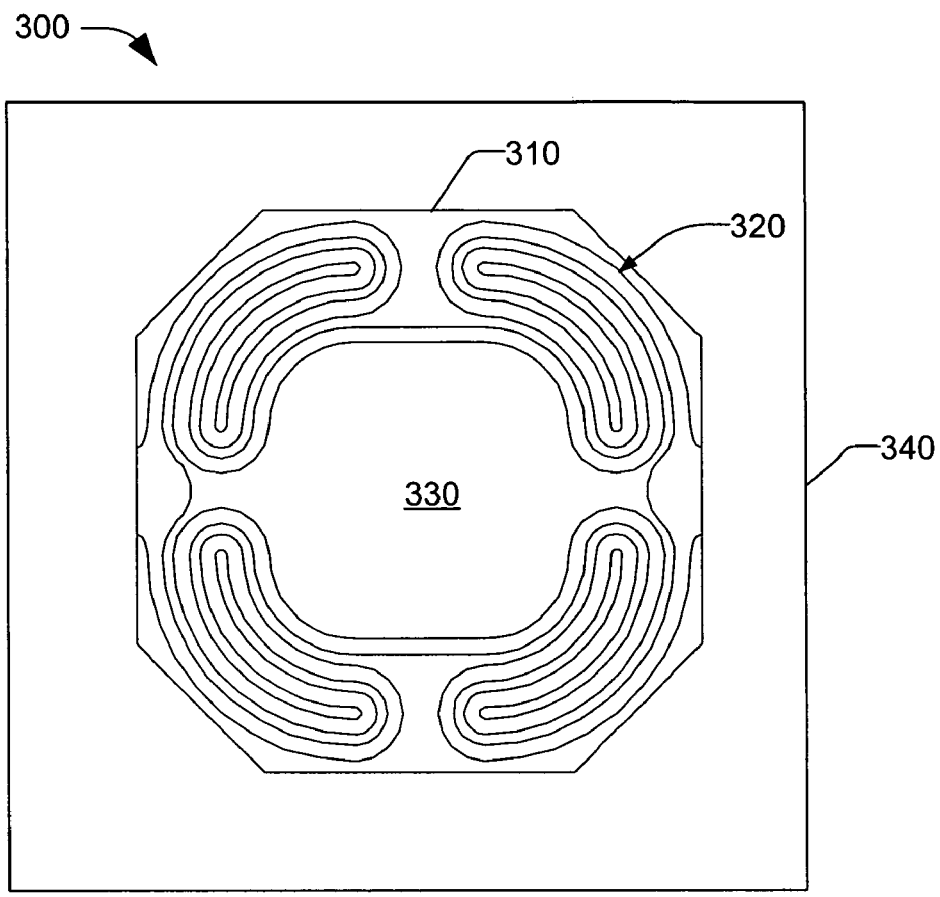
FIG. 3 is a top down view of an exemplary isothermal thin film heater configuration in accordance with an aspect of the present invention.

Referring initially to FIG. 3, an example of an isothermal heater 300 is shown. The isothermal heater 300 can include a thermally conductive foil 310, such as aluminum foil. A heating trace element 320 is coupled to the thermally conductive foil 310; and is arranged around a periphery portion of the thermally conductive foil 310. The thermally conductive foil 310 and heating trace element 320 are coupled to a conductive plate 340, such as a metal plate. FIG. 3 depicts the heating trace element 320 substantially arranged such that a plurality of concentric arcs are formed in corners of the heater. Configuring the heating trace element 320 into concentric arcs such that centers of the arcs are located closer to a center portion 330 of the heater facilitates forming substantially uniform temperature isotherms at the center portion 330 of the heater 300. The center portion 330 does not include the heating trace element 320; while the periphery portion of the thermally conductive foil 310 contains the heating trace element 320 and at least partially surrounds the center portion 330. The heating trace element 320 is generated via photolithography methods; thus, resulting in uniform resistance of the heater 300. Accordingly, an OIC/PLC and/or an AWG (not shown) can be coupled to the center portion 330 of the heater 300 such that temperature variations across the OIC/PLC and/or AWG are mitigated. The size of the center portion 330 of the heater 300 can vary to accommodate different size optical circuits and is more repeatable during assembly.

Figure 4:
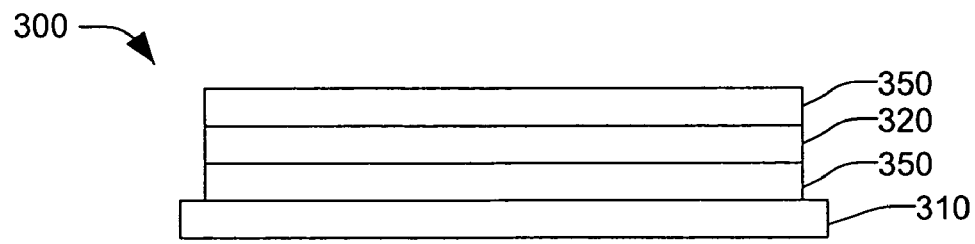
FIG. 4 is a cross sectional view of the exemplary isothermal thin film heater configuration in accordance with an aspect of the present invention.

FIG. 4 illustrates a cross sectional view of isothermal thin film heater 300. The isothermal thin film heater 300 includes the heating trace element 320 positioned between two insulators 350. For example, the insulators can be KAPTON® polyamide or any other suitable polyamide film. The heating trace element 320 and insulator 340 assembly is coupled to the thermally conductive foil 310. A pressure sensitive adhesive can be applied to the thermally conductive foil 310 such that the heater assembly 320, 350 will adhere to the foil 310. The thin film heater 300 is shipped with a non-stick backing (not shown) that is removed from the heater 300 prior to coupling the heater 300 to a larger conductive plate (not shown), such as an aluminum plate. The heater 300 can have a thickness of about 1 mil to about 500 mils. For example, the heater 300 can have a thickness of about 13 mils.

Figure 1:
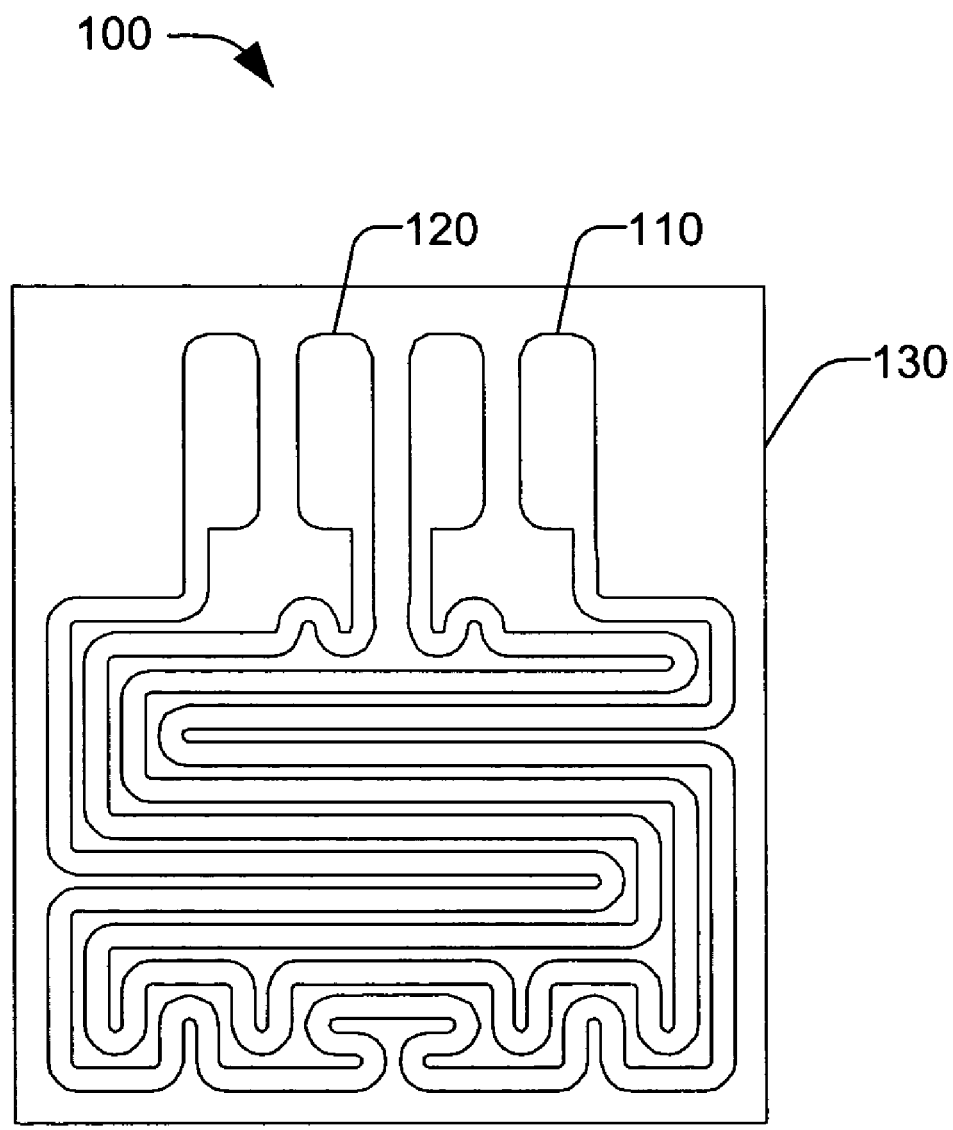
FIG. 1 is a top down view of a conventional constant flux heater configuration in accordance with an aspect of the present invention.
Figure 2:
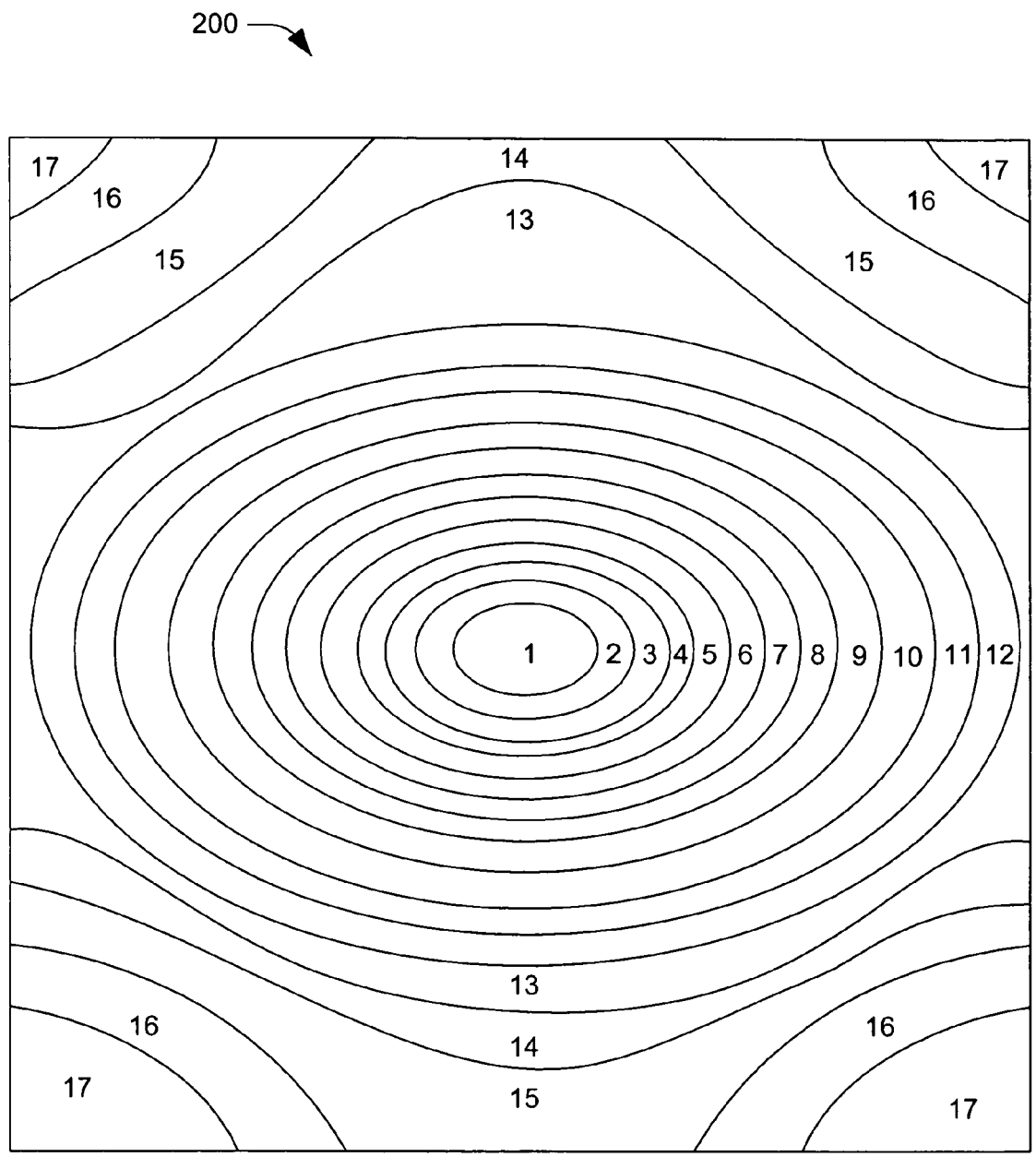
FIG. 2 shows a temperature profile for the conventional constant flux heater configuration of FIG. 1 in accordance with an aspect of the present invention.
Figure 5:
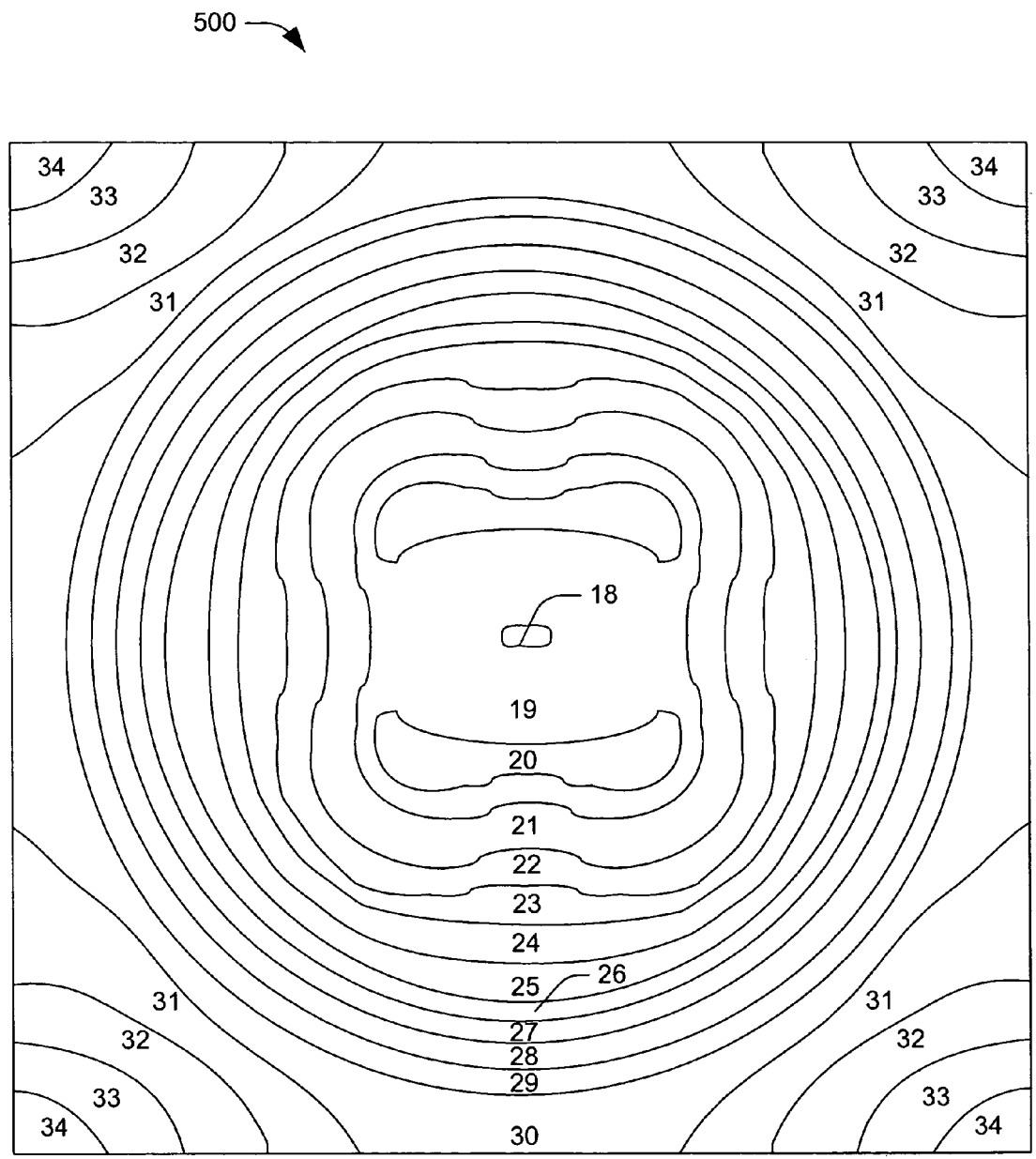
FIG. 5 shows a temperature profile for the exemplary isothermal thin film heater configuration of FIG. 3 in accordance with an aspect of the present invention.

FIG. 5 shows a resulting temperature distribution 500 when the heater 300 of FIG. 3 is attached to a thermally conductive foil 310 at 1.687 watts of heater power in an ambient temperature of −5° C. Thus, for purposes of comparing the isothermal heater 300 with a conventional constant flux heater, FIG. 5 illustrates temperature isotherms for the same power and ambient temperature as the constant flux heater 100 described with respect to FIGS. 1 and 2. A plurality of temperature zones 18–34 for the isothermal heater configuration are shown in Table 2 below.

TABLE 2

| Zone | Temperature (° C.) |
|---|---|
| 18 | 84.470 |
| 19 | 84.505 |
| 20 | 84.540 |
| 21 | 84.470 |
| 22 | 84.400 |
| 23 | 84.365 |
| 24 | 84.330 |
| 25 | 84.295 |
| 26 | 84.260 |
| 27 | 84.225 |
| 28 | 84.190 |
| 29 | 84.155 |
| 30 | 84.120 |
| 31 | 84.085 |
| 32 | 84.050 |
| 33 | 84.016 |
| 34 | 83.981 |

The center portion 330 of the heater 300 has a temperature of about 84.016° C. However, the center portion 330 can be of a plurality of temperatures depending upon the application. Temperature zone 19 of FIG. 5 assumes a relatively large portion of center portion 330 of FIG. 3. This imparts a high degree of temperature uniformity to an OIC (not shown) that is adjacent the heater 300, for example in an OIC package. Further, the center portion 330 is large enough to accommodate the OIC/PLC and/or AWG such that the optical circuits experience a substantially uniform temperature and any substantial variation of temperature across the optical circuits is mitigated.

In Table 2, zones 18, 19, and 20 correspond to center portion 330 of heater 300. The temperature variation is center portion 330 is approximately 0.069° C. (difference between the highest measured temperature and the lowest measured temperature). Compared to heater 100 of FIG. 1, its center portion corresponds to zones 1–8 of Table 1, which provide a temperature variation of approximately 0.402° C.

Thus, the center portion of a heater, according to the present invention, has a substantially uniform temperature. For example, in one embodiment, the center portion of a heater has temperature variation of about 0.20° C. or less. In another embodiment, the center portion of a heater has a temperature variation of about 0.10° C. or less. In yet another embodiment, the center portion of a heater has a temperature variation of about 0.07° C. or less.

Figure 6:
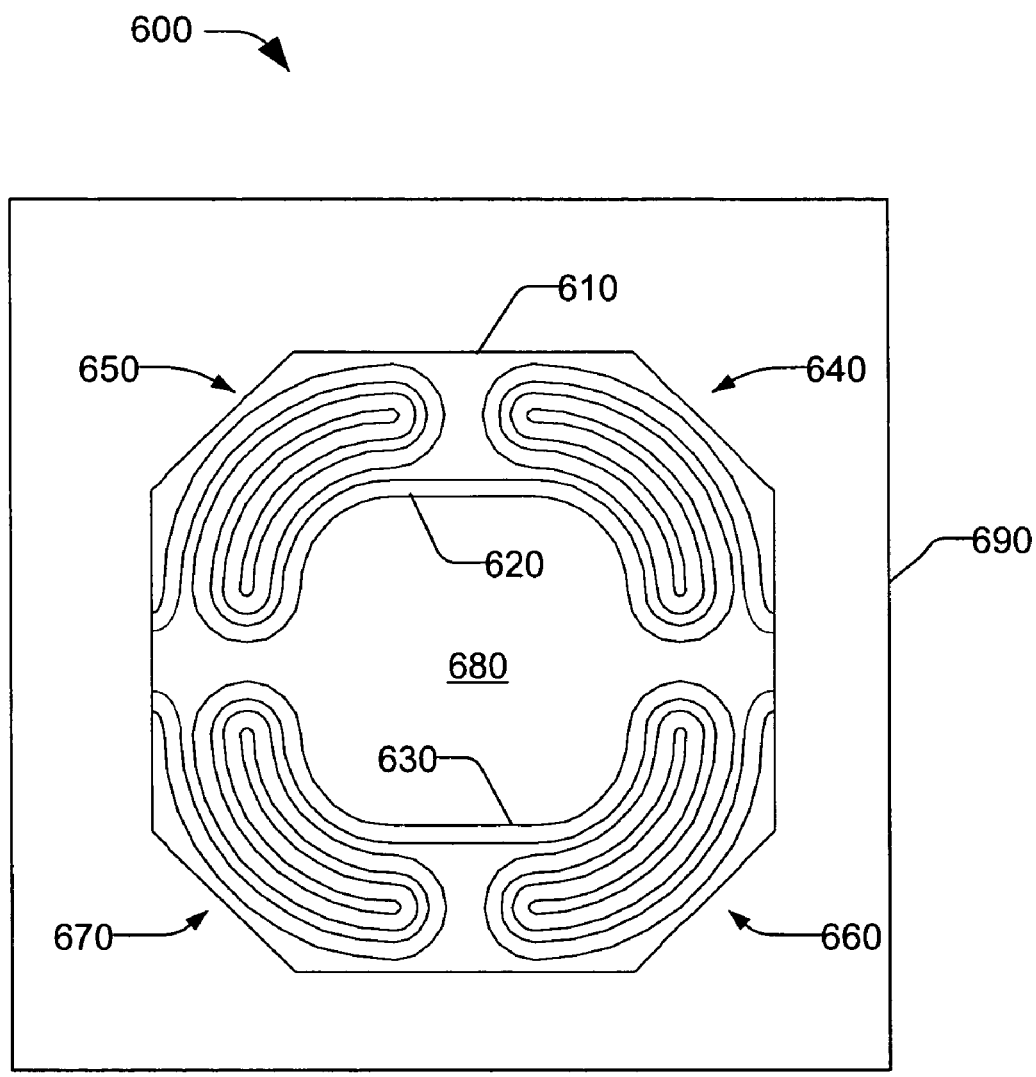
FIG. 6 is a top down view of another exemplary isothermal thin film heater configuration in accordance with an aspect of the present invention.

FIG. 6 depicts an alternate heater configuration in accordance with an aspect of the present invention. An isothermal heater 600 comprises a thermally conductive (e.g., aluminum) foil 610 coupled to a first heating element trace 620 and a second heating element trace 630 arranged around a periphery portion of the heater 600. The first heating element trace 620 is configured such that concentric arcs are formed in first 640 and second 650 corners of the heater 600. The second heating element trace 630 is configured such that concentric arcs are formed in third 660 and fourth 670 corners of the heater 600. Preferably, the concentric arcs are located on the heater 600 such that centers of the arcs correspond with a center portion 680 of the heater 600. The heater 600 is coupled to a conductive plate 690, such as a metal plate.

Figure 7:
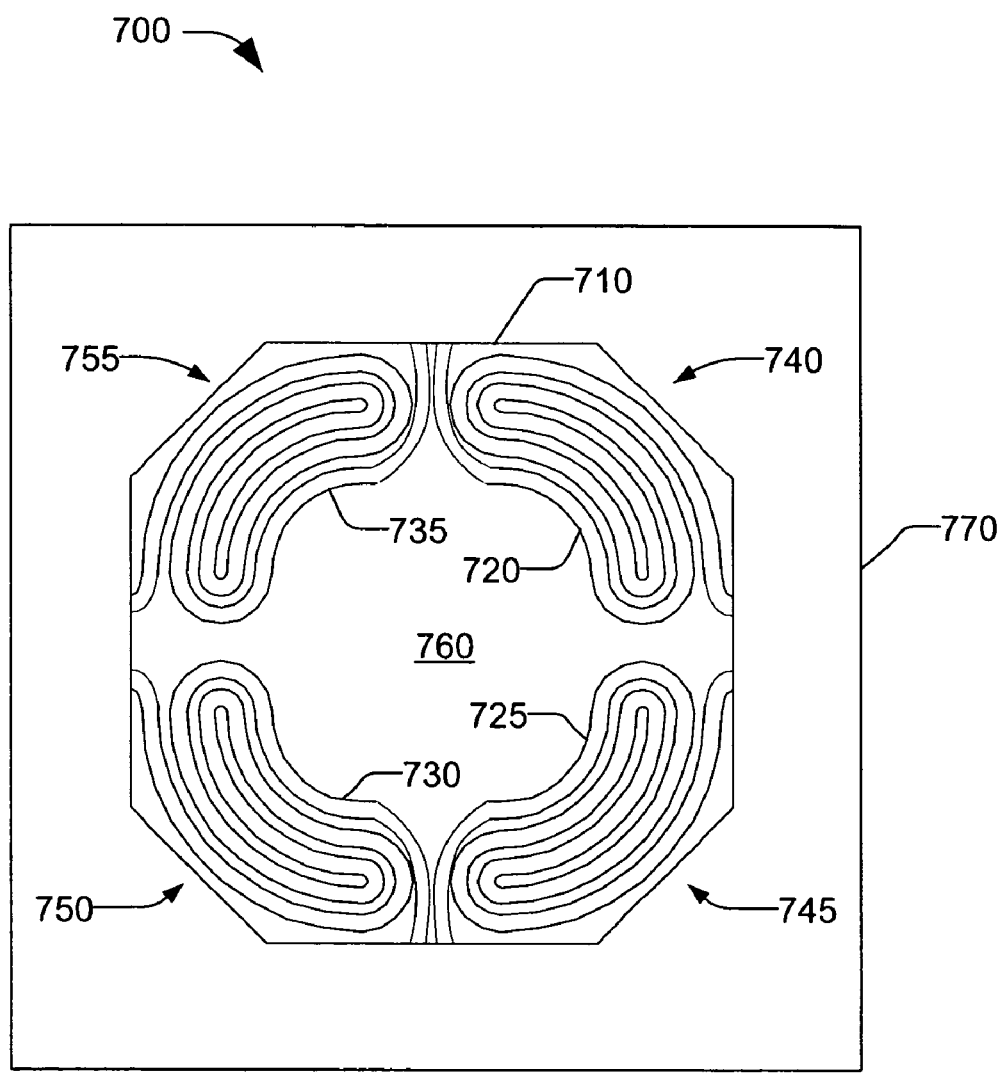
FIG. 7 is a top down view of yet another exemplary isothermal thin film heater configuration in accordance with an aspect of the present invention.

FIG. 7 depicts another heater configuration in accordance with an aspect of the present invention. Similar to heater 600 described with respect to FIG. 6, heater 700 includes a thermally conductive (e.g., aluminum) foil 710 coupled to heating element traces. However, rather than the first 620 and second 630 heating element traces depicted in FIG. 6, heater 700 comprises first 720, second 725, third 730, and fourth 735 heating element traces. The heating element traces 720–735 are configured into concentric arcs in respective corners 740–755 of the heater 700. The centers of the arcs correspond with a center portion 760 of the heater 700. Further, the heating element traces 720–735 are located around a periphery portion of the heater 700 such that temperature isotherms in the center portion 760 of the heater 700 become substantially uniform. Thus, it is to be appreciated that an isothermal heater can have any number of heating element traces and is contemplated as falling within the scope of the present invention. Also, similar to the heater of FIG. 6, heater 700 is coupled to a conductive plate 770.

Figure 8:
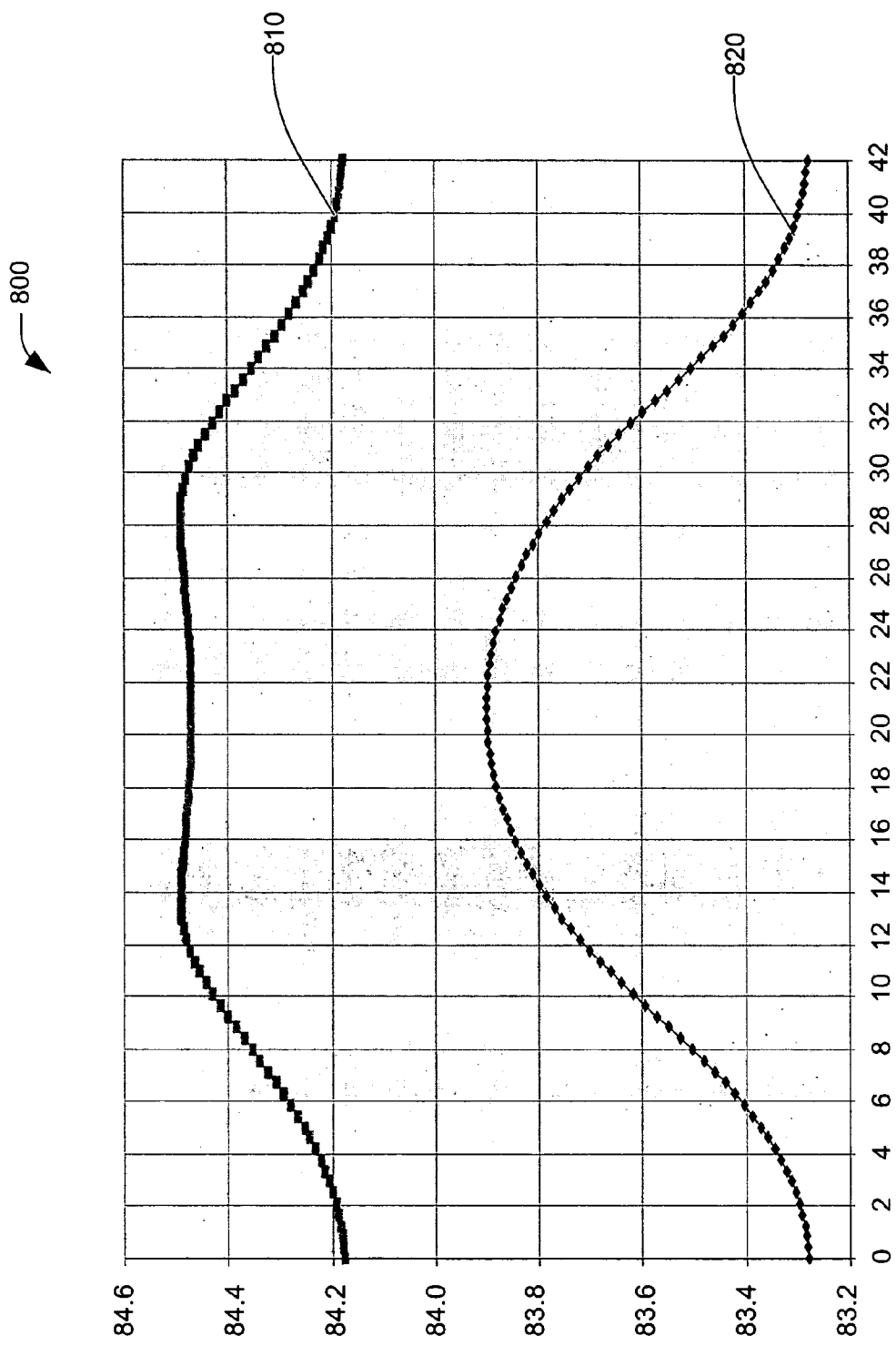
FIG. 8 is a graph plotting temperature versus a horizontal path across the middle of the conventional constant flux heater configuration of FIG. 1 and the exemplary isothermal heater configuration of FIG. 3 in accordance with an aspect of the present invention.

FIG. 8 shows temperature path profiles 810 and 820 for both a conventional constant flux heater and an isothermal heater, respectively, superimposed on the same graph 800. The temperature uniformity of a center portion of the isothermal heater is clearly shown in path profile 820, whereas the conventional constant flux heater does not include any substantially uniform area in which to place an optical circuit.

Accordingly, as shown above, one advantage of employing a single isothermal heater is that the temperature uniformity within the middle of the heater is very precise. The size of the middle of the heater (isothermal area) can be tuned to accommodate different size optical circuits and is more repeatable during assembly. The resistance of each leg is very uniform because of photolithography methods used to generate the heating trace.

Figure 9:
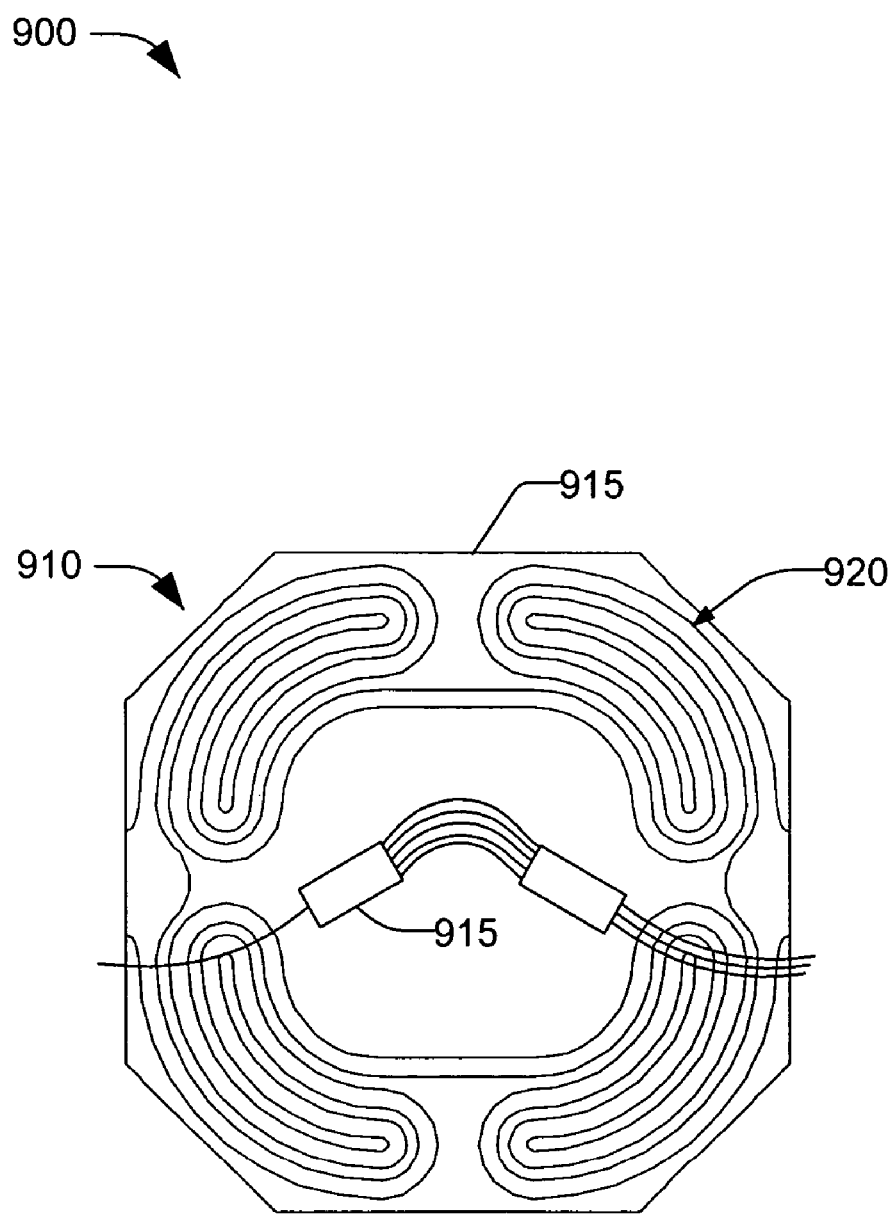
FIG. 9 shows a system employing an isothermal thin film heater in accordance with an aspect of the present invention.

Turning now to FIG. 9, a system 900 for reducing temperature variations across arrayed-waveguide gratings (AWGs) is shown. An AWG 905 is supported over a thin film heater 910 and/or a conductive plate (not shown). The thin film heater 910 includes a thermally conductive foil 915 and at least one heating element trace 920, which generates heat. The thermally conductive foil 915 is conductive so as to transfer heat from the heating element trace(s) 920 to the AWG 905. The heating element trace(s) 920 are arranged about a periphery portion of the thermally conductive foil 915 so as to provide uniform distribution of heat to the AWG 905. Any suitable heating element trace(s) (e.g., electric coils, ceramic heaters, heating plates, thermoelectric heaters, gas heaters) can be employed if appropriate to carry out the present invention and are intended to fall within the scope of the hereto appended claims. It is to be appreciated that the heating element trace(s) 920, can also be incorporated within the thermally conductive foil 915.

Figure 10:
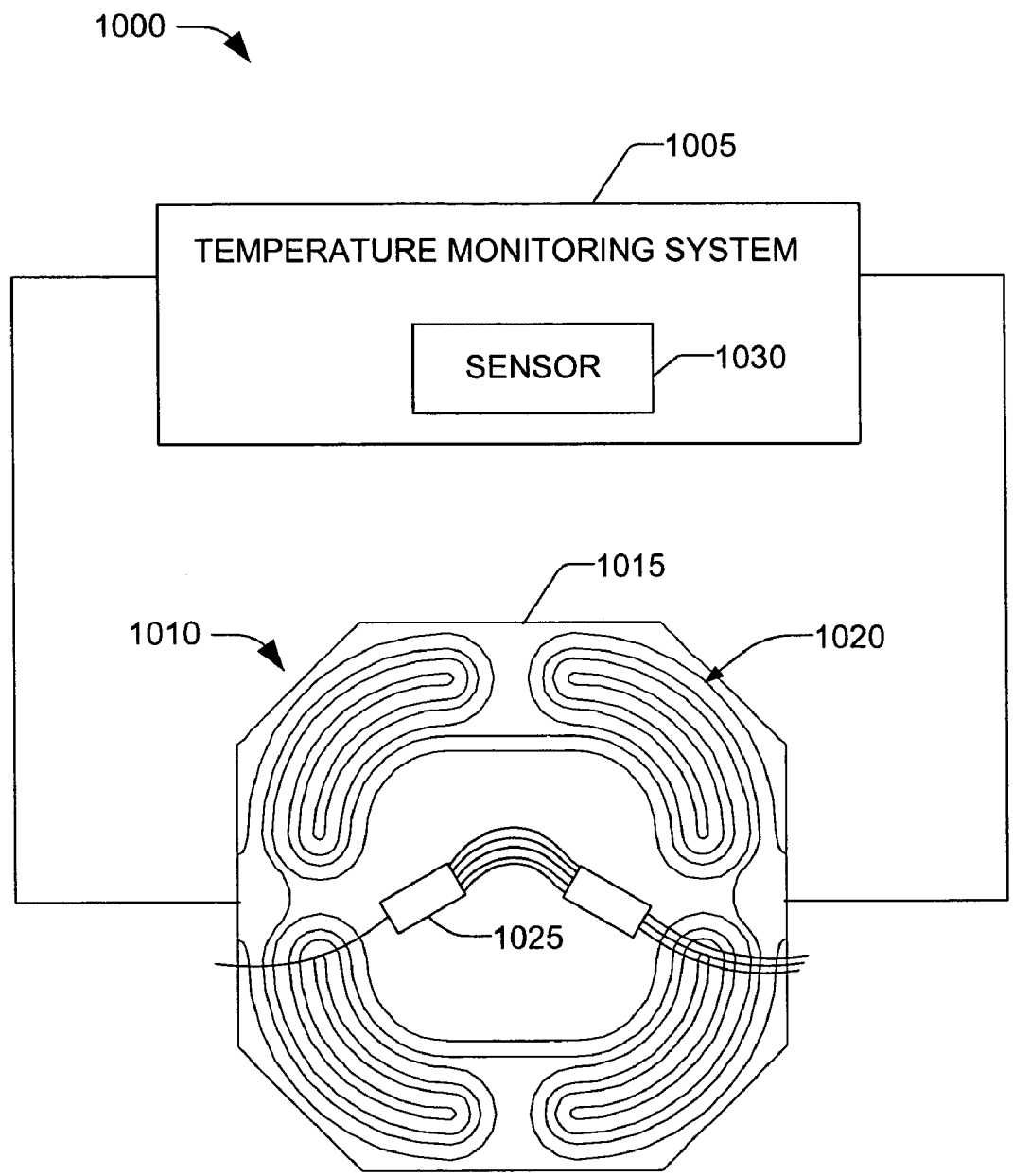
FIG. 10 shows another system employing an isothermal thin film heater in accordance with an aspect of the present invention.

Turning now to FIG. 10, a system 1000 for reducing temperature variations across arrayed-waveguide gratings (AWGs) which includes a temperature monitoring system 1005 is illustrated. The temperature monitoring system 1005 is coupled to an isothermal thin film heater 1010. The heater 1010 comprises a conductive thermally conductive foil 1015 and/or a conductive plate (not shown) and at least one heating element trace 1020. The temperature monitoring system 1005 provides temperature information during the above described process in order to facilitate uniform heating of an AWG 1025. The temperature monitoring system 1005 can provide the temperature information of the heater 1010 and/or the AWG 1025. Accordingly, the temperature information can be employed to provide adjustment of the temperature of the heater 1010 and/or AWG 1025, if needed. Alternatively, the temperature monitoring system 1005 can provide temperature information of the conductive thermally conductive foil 1015, and/or heating element trace(s) 1020, and/or the conductive plate (not shown) on which the heater is mounted. Thus, it is to be appreciated that the temperature monitoring system 1005 can provide temperature information of any suitable component of the system 1000. The temperature monitoring system 1005 includes a temperature sensor 1030 for determining a temperature of the AWG 1025 and/or heater 1010. It is to be appreciated that the temperature sensor 1030 selected will depend on the particular material being heated, and the desired range of heating temperatures.

Figure 11:
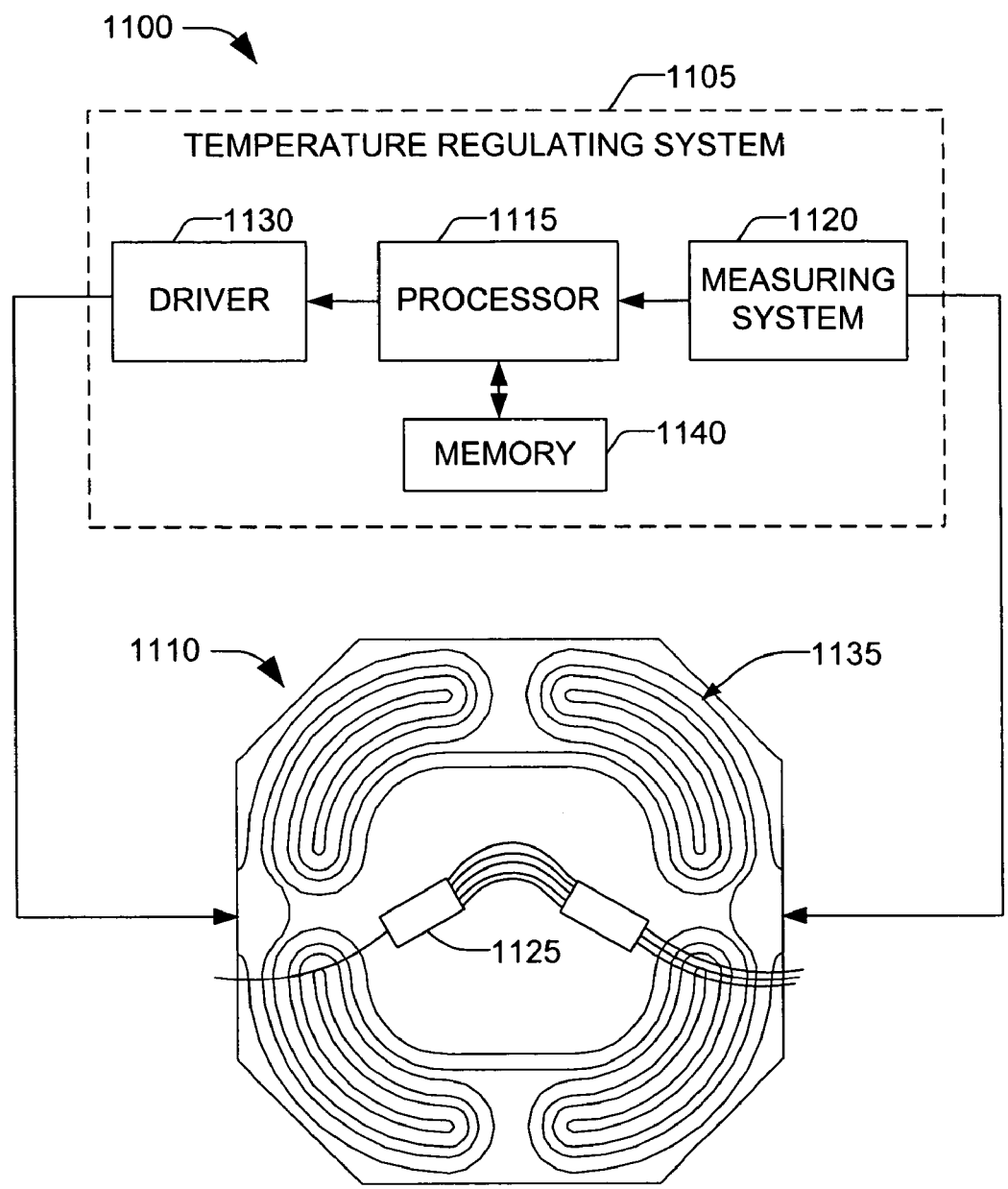
FIG. 11 shows yet another system employing an isothermal thin film heater in accordance with an aspect of the present invention.

Turning now to FIG. 11, another exemplary system 1100 employing an isothermal thin film heater is depicted. System 1100 includes a temperature regulating system 1105 for regulating a temperature of a thin film heater 1110. The temperature regulating system 1105 comprises a processor 1115 for receiving data from a temperature measuring system 1120 and determining a temperature of an optical device, (e.g., an AWG) 1125 and/or the heater 1110. The processor 1115 is operatively coupled to the temperature regulating system 1105 and is programmed to control and operate the various components within the system 1100 in order to carry out the various functions described herein. The processor 1105 can be coupled to a heating element driver 1130, which drives heat element trace(s) 1135 coupled to the thin film heater 1110. The heating element driver 1130 can be controlled by the processor 1115 so as to selectively vary heat output of various heating element trace(s) 1135. The processor (or CPU) 1115 may be any of a plurality of suitable processors. The manner in which the processor 1115 can be programmed to carry out the functions relating to the present invention will be readily apparent to those having ordinary skill in the art based on the description provided herein.

A memory 1140, which is operatively coupled to the processor 1115, is also included in the system 1100 and serves to store program code executed by the processor 1115 for carrying out operating functions of the system 1100 as described herein. The memory 1140 includes read only memory (ROM) and random access memory (RAM). The ROM contains among other code the Basic Input-Output System (BIOS) which controls the basic hardware operations of the system 1100. The RAM is the main memory into which the operating system and application programs are loaded. The memory 1140 also serves as a storage medium for temporarily storing information such as AWG temperature, heater temperature, acceptable temperature tables, and other data which may be employed in carrying out the present invention. For mass data storage, the memory 1140 may include a hard disk drive (e.g., 10 Gigabyte hard drive). A power supply (not shown) can be utilized to provide operating power to the system 1100. Any suitable power supply (e.g., battery, line power) may be employed to carry out the present invention.

Figure 12:
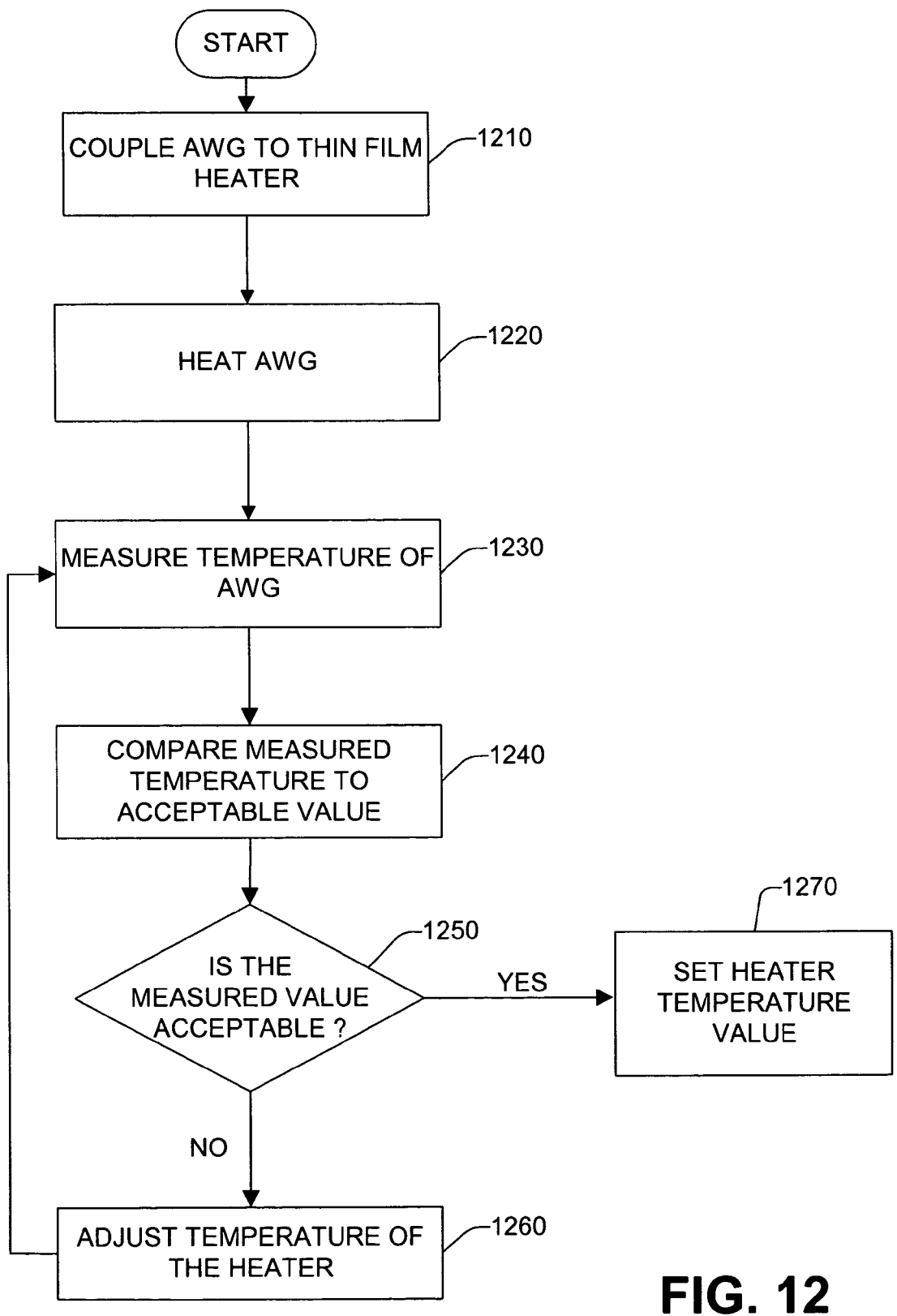
FIG. 12 shows a methodology for employing an isothermal thin film heater in accordance with an aspect of the present invention.

FIG. 12 is a flow diagram illustrating a methodology for carrying out an aspect of the present invention. In step 1210, an AWG is coupled to an isothermal thin film heater. In step 1220, the AWG is heated, for instance by a conductive thermally conductive foil having at least one heating element trace. In step 1230, a temperature of the AWG is measured. In step 1240, the measured temperature of the AWG can then be compared to an acceptable value, or an acceptable value range. In step 1250, if the measured temperature is not an acceptable value, or not within an acceptable value range (NO), step 1260 is then performed, and the temperature of the heater is adjusted. Step 1230 is then repeated and the temperature of the AWG is measured. In step 1250, if the measured temperature is an acceptable value, or within an acceptable value range (YES), step 1270 is performed where the heater temperature is set and the AWG is maintained at a substantially constant temperature.

Figure 13:
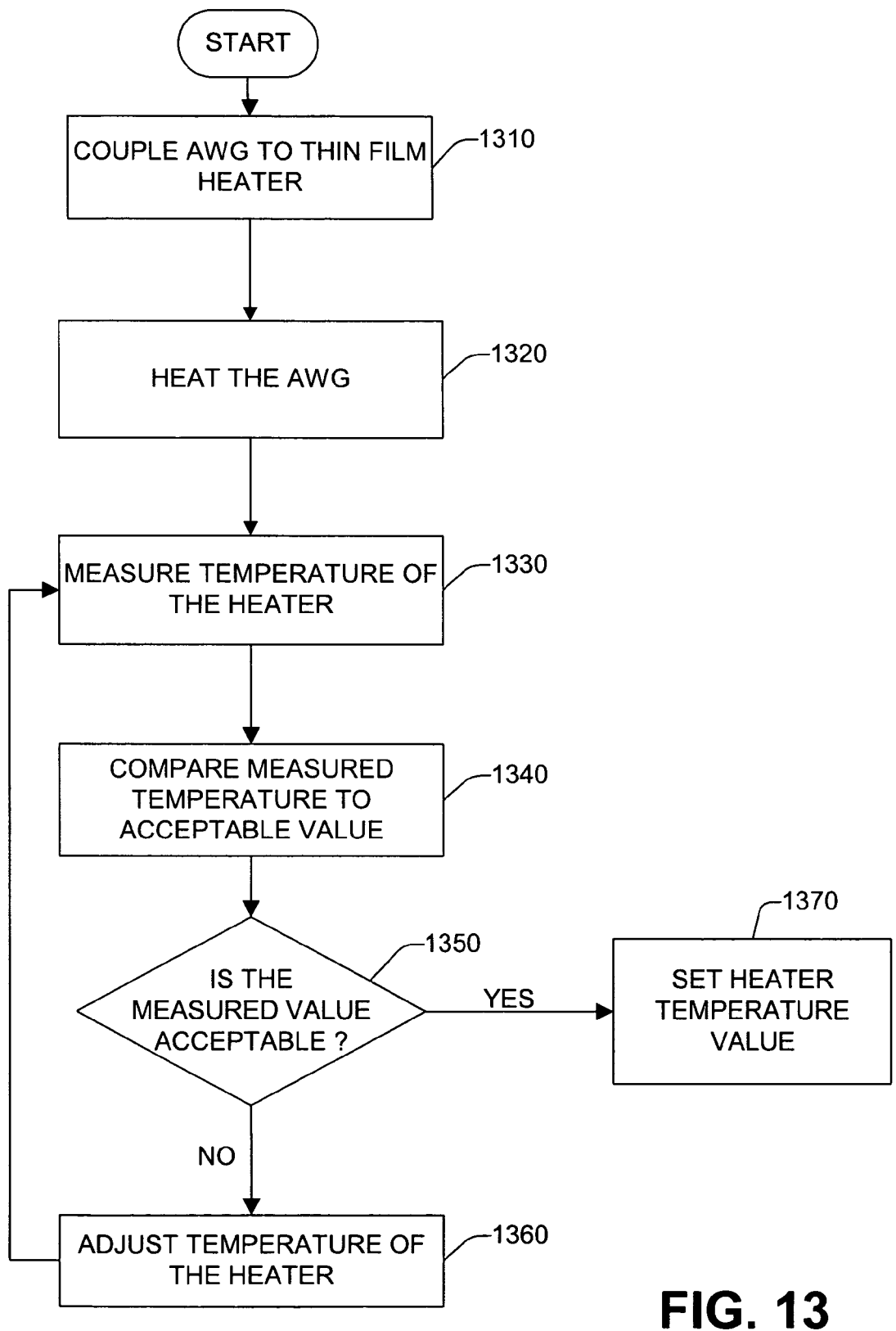
FIG. 13 shows another methodology for employing an isothermal heater in accordance with an aspect of the present invention.

FIG. 13 is a flow diagram illustrating another methodology for carrying out an aspect of the present invention. In step 1310, an AWG is coupled to an isothermal thin film heater. In step 1320, the AWG is heated, for instance by a thermally conductive foil having at least one heating element trace. In step 1330, the temperature of the heater is measured. The heater can be measured in a central region of the heater where the AWG is positioned. In step 1340, the measured temperature of the heater can then be compared to an acceptable value, or an acceptable value range. In step 1350, if the measured temperature is not an acceptable value, or not within an acceptable value range (NO), step 1360 is then performed, and the temperature of the heater is adjusted in step 1370. The heater can be adjusted, for instance, by adjusting the temperature of the heating element trace(s). Step 1330 is then repeated and the temperature of the heater is measured. In step 1350, if the measured temperature is an acceptable value, or within an acceptable value range (YES), step 1380 is performed and the temperature value of the heater is set.

The present invention provides for a system and method for heating an AWG in a substantially uniform manner. As a result, the present invention facilitates minimizing temperature variations in AWGs in accordance with the present invention.

The figures depicting the geometry of the heating elements have been illustrated herein as having four heating zones located near an edge of a heater. However, it is to be appreciated that the heating element arrangement is not limited to a pattern that is ¼ symmetric. For example, a substantially similar result can be achieved by employing an arrangement of three heating element zones spaced circumferentially at 120 degrees, or two heating element zones that are ½ symmetric about the center. Similarly, a singular circular heating element pattern can be utilized to achieve a similar result. Accordingly, it is to be appreciated that any number of heating zones arranged in any pattern having two axes of symmetry or one symmetric axis and one asymmetric axis can be employed and is contemplated as falling within the scope of the present invention.

Also, depicted throughout the figures is a generally square base plate shape. However, it is to be appreciated that any shape base plate can be employed, such as circle, polygon, hexagon, pentagon, rectangle, triangle, and the like. Accordingly, any shape base plate can be employed with any shape and/or number of heating elements to generate similar results as described herein.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An isothermal thin film heater comprising:
   a conductive plate comprising a metal plate; and
   at least one heating element trace coupled to the plate, the plate having a periphery portion and a center portion, wherein the heating element trace is configured as a plurality of concentric arcs located around the periphery portion of the plate but not in the center portion, wherein the center portion substantially supports an optical integrated circuit.

2. The thin film heater of claim 1, wherein the metal plate comprises an aluminum plate.

3. The thin film heater of claim 1 having one heating element trace.

4. The thin film heater of claim 1 having two heating element traces.

5. The thin film heater of claim 1 having four heating element traces.

6. The thin film heater of claim 1, wherein the plurality of concentric arcs are located in respective corners of the heater.

7. The thin film heater of claim 1, wherein the optical circuit comprises an arrayed-waveguide grating.

8. The thin film heater of claim 1, wherein the center portion has a temperature variation of about 0.20 °C. or less.

9. The thin film heater of claim 1, wherein the center portion has a temperature variation of about 0.10 °C. or less.

10. The thin film heater of claim 1, wherein the center portion has a temperature variation of about 0.07 °C. or less.

11. An optical integrated circuit package comprising:
    an isothermal thin film heater having a center portion of substantially uniform temperature, wherein the isothermal thin film heater includes at least one heating element trace configured as a plurality of concentric arcs around a periphery portion of the heater; and
    an optical integrated circuit, wherein the center portion has a temperature variation of about 0.20 °C. or less.

12. The optical integrated circuit package of claim 11, wherein the optical integrated circuit comprises an arrayed-waveguide grating.

13. The optical integrated circuit package of claim 11, further comprising a temperature sensor.

14. An optical communication system employing the optical integrated circuit package of claim 11.

15. A system for reducing temperature variations across arrayed-waveguide gratings comprising:
    an isothermal thin film heater having a center portion of substantially uniform temperature for supporting an arrayed-waveguide grating; and
    a temperature monitoring system, wherein the center portion has a temperature variation of about 0.20 °C. or less,
    wherein the isothermal thin film heater comprises:
    a conductive plate; and
    at least one heating element trace coupled to the plate, wherein the heating element trace is configured as a plurality of concentric arcs located around a periphery portion of the heater.

16. The system of claim 15, wherein the temperature monitoring system monitors a temperature of the isothermal thin film heater.

17. The system of claim 15, wherein the temperature monitoring system monitors a temperature of the arrayed-waveguide grating.

18. The system of claim 15, the temperature monitoring system comprising a sensor for sensing a temperature of at least one of the heater and the arrayed-waveguide grating.

19. A method for fabricating an isothermal thin film heater comprising:
 coupling at least one heating element trace to a conductive plate comprising a metal plate, wherein the heating element trace is configured as a plurality of concentric arcs located around a periphery portion of the heater but not in a center portion of the heater, wherein the center portion substantially supports an optical integrated circuit.

20. A method for heating an arrayed-waveguide grating comprising:
 coupling the arrayed-waveguide grating to an isothermal thin film heater, the isothermal thin film heater comprising: a conductive plate comprising a metal plate; and at least one heating element trace coupled to the plate, the plate having a periphery portion and a center portion, wherein the heating element trace is configured as a plurality of concentric arcs located around the periphery portion of the plate and the center portion has a temperature variation of about 0.20 °C. or less;
 heating the arrayed-waveguide grating;
 measuring a temperature of at least one of the thin film heater and the arrayed-waveguide grating; and
 adjusting the temperature of at least one of the thin film heater and the arrayed-waveguide grating if the measured temperature is not acceptable.

21. An isothermal thin film heater comprising:
 a conductive plate; and
 at least one heating element trace coupled to the plate, the plate having a periphery portion and a center portion, wherein the heating element trace is configured as a plurality of concentric arcs located around the periphery portion of the plate, and the center portion has a temperature variation of about 0.20 °C. or less, wherein the center portion substantially supports an optical integrated circuit, wherein the optical circuit comprises an arrayed-waveguide grating.

* * * * *